United States Patent
Kumar et al.

(10) Patent No.: US 9,845,084 B2
(45) Date of Patent: Dec. 19, 2017

(54) SYSTEM AND METHOD FOR TRACTION CONTROL

(71) Applicant: GENERAL ELECTRIC COMPANY, Schenectady, NY (US)

(72) Inventors: Ajith Kuttannair Kumar, Erie, PA (US); Bret Dwayne Worden, Erie, PA (US); Glenn Lovercheck, Erie, PA (US); Dharmdeo Singh, Erie, PA (US); Jingjun Zhang, Erie, PA (US); Jeremy McGarry, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/159,372

(22) Filed: May 19, 2016

(65) Prior Publication Data

US 2017/0334414 A1    Nov. 23, 2017

(51) Int. Cl.
*B60T 8/17* (2006.01)
*B60T 8/175* (2006.01)
*B60T 8/171* (2006.01)

(52) U.S. Cl.
CPC ............ *B60T 8/1705* (2013.01); *B60T 8/171* (2013.01); *B60T 8/175* (2013.01); *B60T 2270/20* (2013.01)

(58) Field of Classification Search
CPC ......... B60T 8/1705; B60T 8/171; B60T 8/175
USPC ........................................................ 701/20
See application file for complete search history.

(56) References Cited

U.S. PATENT DOCUMENTS

| | | | | |
|---|---|---|---|---|
| 4,347,569 A | * | 8/1982 | Allen, Jr. | B60T 8/1705 180/197 |
| 5,431,241 A | * | 7/1995 | May | B60K 28/16 180/197 |
| 5,661,378 A | * | 8/1997 | Hapeman | B60L 3/10 318/362 |
| 6,499,815 B1 | | 12/2002 | Daigle | |
| 6,745,083 B2 | * | 6/2004 | Eckardt | G05B 23/0235 700/2 |
| 2005/0189886 A1 | * | 9/2005 | Donnelly | B60L 3/102 318/52 |
| 2008/0051967 A1 | * | 2/2008 | Tarnow | B60L 3/10 701/71 |
| 2015/0217790 A1 | * | 8/2015 | Golden | B61L 15/0072 701/19 |
| 2016/0359741 A1 | * | 12/2016 | Cooper | B61C 17/12 |

* cited by examiner

*Primary Examiner* — Yazan Soofi
(74) *Attorney, Agent, or Firm* — Global Patent Operation; John A. Kramer (57) ABSTRACT

A system includes a sensor and a controller. The sensor is configured to detect sliding of a wheel of a vehicle. The controller is configured to communicate with the sensor and a traction motor operatively connected to the wheel such that the traction motor selectively applies forces in at least one direction to the wheel during operation. The controller is further configured to direct the traction motor to apply a motoring slide reducing force to the wheel when the sensor detects sliding of the wheel resulting from a frictional braking force.

20 Claims, 4 Drawing Sheets

SYSTEM AND METHOD FOR TRACTION CONTROL

BACKGROUND

Technical Field

Embodiments of the invention relate to traction control in wheeled vehicles.

Discussion of Art

Some types of vehicles may use wheels to traverse a surface. In such vehicles, a wheel may have a surface formed by the exterior of the circumference of the wheel, known as the contact surface that contacts with the traversed surface. The part of the contact surface that is in contact with the traversed surface at any particular moment is known as the contact area. A frictional force exists between the contact area and the traversed surface referred to as the wheel-contact-surface frictional force.

Certain wheeled vehicles control their speed by applying accelerating forces, e.g., propulsion and braking forces, to one or more wheels. However, when an acceleration force that exceeds the wheel-contact-surface frictional force is applied to a wheel, the wheel may slip in relation to the traversed surface. Wheel slip occurs when the wheel contact area does not track the traversed surface. Wheel slip may result in wheel spin, i.e., "positive wheel creep", when the applied acceleration force is a propulsion force or in wheel slide, i.e., "negative wheel creep", when the applied acceleration force is a braking force. Wheel spin occurs when a wheel rotates on its axle without tracking the traversed surface such that the rotational speed of the wheel exceeds the corresponding velocity of the wheeled vehicle. A partial wheel slide occurs when a wheel rotates at a speed slower than that required to result in no relative motion at the contact area. A full wheel slide occurs when a wheel has stopped rotation completely while the vehicle is still in motion. This is commonly referred to as wheel lockup or locking/locked wheel.

Wheel slip may be potentially problematic as the sliding or spinning of wheels along the traversed surface may cause excessive wear, flat spots and/or other types of damage to a wheel or the traversed surface. For example, in a full wheel slide, a high amount of abrasive and thermal energy is applied at a singular wheel tread location that may cause flat spots and/or other types of damage to a wheel. In particular, the high temperatures created between a sliding and/or spinning wheel and the traversed surface can cause spalling, i.e., a transformation of a thin surface layer of the wheel. Additionally, wheel slide can reduce the ability of an operator, e.g. human and/or machine, to control/drive the wheeled vehicle.

Aggressive application of accelerating forces on a wheel by an operator may increase the chance that wheel slide will occur. Operators, however, are not always aware that they are aggressively applying an excessive accelerating force to a wheel. Accordingly, operators sometimes apply braking forces in excess of what is needed to maintain adequate control of a wheeled vehicle or in excess of the available friction between the wheel contact area and the traversed surface. Such braking may increase the wear on the wheels resulting in reduced wheel service life and increased operational costs of the wheeled vehicle and potential damage to the surface which contact the wheel. Moreover, the design of certain frictional braking systems is such that an operator's ability to arrest and/or control a wheel slide is limited. Further, current automatic wheel slide protection technologies, such as traditional antilock brakes, have limited potential due to slow responsiveness inherent in the mechanical design of modern braking systems, e.g., a pneumatic braking system in which compressible fluid and substantial control volumes often result in slow responses to changes in frictional braking forces.

Wheel slip control (traction control) systems utilize measured wheel speed and vehicle speed signals to modulate or reduce the amount of torque or power provided by, or being absorbed by (dynamic braking), the propulsion system in order to limit wheel creep. For example, in motoring modes, some wheel slip control systems may reduce the motoring forces on the wheel to limit the positive creep of the wheel. In dynamic braking modes, some wheel slip control systems will limit the braking forces in order to limit the negative creep of the wheel. Such systems, however, do not use propulsion forces to limit wheel slides that are caused by excessive friction brake application.

In view of the above, there may be a need for a system and method which differ from those systems and methods that are currently available.

BRIEF DESCRIPTION

In an embodiment, a system includes a sensor and a controller. The sensor is configured to detect sliding of a wheel of a vehicle. The controller is configured to communicate with the sensor and a traction motor operatively connected to the wheel such that the traction motor selectively applies forces in at least one direction to the wheel during operation. The controller is further configured to direct the traction motor to apply a motoring slide reducing force to the wheel when the sensor detects sliding of the wheel resulting from a frictional braking force.

In an embodiment, a method for a vehicle includes detecting sliding of a wheel on a route surface resulting from a frictional braking force; and applying a slide reducing force to the wheel via a traction motor operatively connected to the wheel.

In an embodiment, a controller is configured to communicate with a sensor and a traction motor. The sensor detects sliding of a wheel of a vehicle, and the traction motor operatively connects to the wheel so as to selectively apply a motoring or a braking force to the wheel during operation. The controller is further configured to direct the traction motor to apply a motoring slide reducing force to the wheel when the sensor detects sliding of the wheel resulting from a frictional braking force. The controller may comprise at least one processor and one or more input/output ports, with the at least one processor configured to communicate with the sensor and the traction motor through the one or more input/output ports.

In an embodiment, a wheeled vehicle includes a body, a braking system, a traction motor, a sensor, and a controller. The body includes a plurality of wheels that allow the wheeled vehicle to traverse a route surface. The braking system provides a braking force to a wheel to slow the vehicle and reduce the vehicle speed. The traction motor is operatively connected to the wheel. The sensor detects sliding of the wheel. The controller communicates with the braking system, the traction motor, and the sensor. When the sensor detects sliding of the wheel, the controller may adapt the traction motor to apply a slide reducing force to the wheel in the motoring direction such that the rotational speed of the wheel is limited to a specified creep level during the period of time that the applied braking force exceeds the friction available at the wheel contact surface. That is, motoring force from the traction motor is applied and regulated by the controller such that a rotational speed of the wheel is controlled to substantially match the vehicle speed, and thus to increase or maximize tractive effort, and reduce the rotational speed of the wheel (and the vehicle speed) at a rate that reduces sliding, and increases adhesion. Increasing tractive effort allows the actual vehicle speed to attain the desired vehicle speed in a minimized or determined period of time.

In an embodiment, a train (e.g., one or more locomotives, and optionally one or more rail cars) includes a body, a friction brake, an electric traction motor, a sensor, and a controller. The body includes a plurality of wheels that allow the train to traverse a set of rails. The friction brake provides an extended braking force to a wheel of the plurality intended to limit or slow a rotational speed of the wheel over a determined period of time. The electric traction motor is operatively connected to the wheel. The sensor detects sliding of the wheel by comparing a speed of the wheel to a speed of the train. The controller communicates with the friction brake, the traction motor, and the sensor. When the sensor detects sliding of the wheel, the controller adapts the traction motor to apply a transient motoring torque to the wheel such that the rotational speed of the wheel is limited to a specified creep level during the period of time the applied friction braking force exceeds the friction available at the wheel/rail contact surface.

DETAILED DESCRIPTION

Embodiments of the invention relate to vehicle control. Certain embodiments relate to systems and methods for traction control in a wheeled vehicle having traction motors. For example, in an embodiment, a system includes a traction motor, a sensor, and a controller. The traction motor may operatively connect to a wheel of a wheeled vehicle. The sensor may detect sliding of the wheel. The controller communicates with the sensor and the traction motor. The controller applies a slide reducing force to the wheel via the traction motor when the sensor detects sliding of the wheel.

In exemplary instances, a traversed surface, route surface, and/or some other surface can be a metal rail, pavement, earth and/or any other type of surface over which a wheeled vehicle may traverse/move across as it travels along a route. Rail vehicle can be a locomotive, switcher, shunter, and the like and includes both freight haulage and passenger locomotives, which themselves may be diesel electric or all electric, and that may run on either AC or DC electrical power. Onboard refers to on and/or within a wheeled vehicle. The terms "rail" and "track" may be used interchangeably throughout, and where practical refers to routes, pathways and roads, and the opposite is true. The term "adhesion requirement" means the amount of adhesion required between the contact area of a wheel and the traversed surface in order to prevent the wheel from slipping. The terms "slide" and "sliding", as used herein with respect to wheels, refer to the pre/partial sliding and/or full/complete slide of a wheel. "Pre-sliding" is defined herein to mean the stages of a wheel slide, before the onset of a full wheel slide, where the rotational speed of a wheel begins to slow below synchronous speed.

The term "slide risk" refers to the risk that a wheel will enter a slide. Although discussed in more detail elsewhere herein, the term friction modifying material or friction modifier may be water, steam, air, oil, a lubricant, or may be the removal or application of sand, water, snow or a friction enhancing agent that exists on the surface at the time. The terms "electrically coupled," "electrically connected," and "electrical communication" mean that the referenced elements are directly or indirectly connected such that an electrical current may flow from one to the other. The connection may include a direct conductive connection, i.e., without an intervening capacitive, inductive or active element, an inductive connection, a capacitive connection, and/or any other suitable electrical connection. Intervening components may be present.

Figure 1:
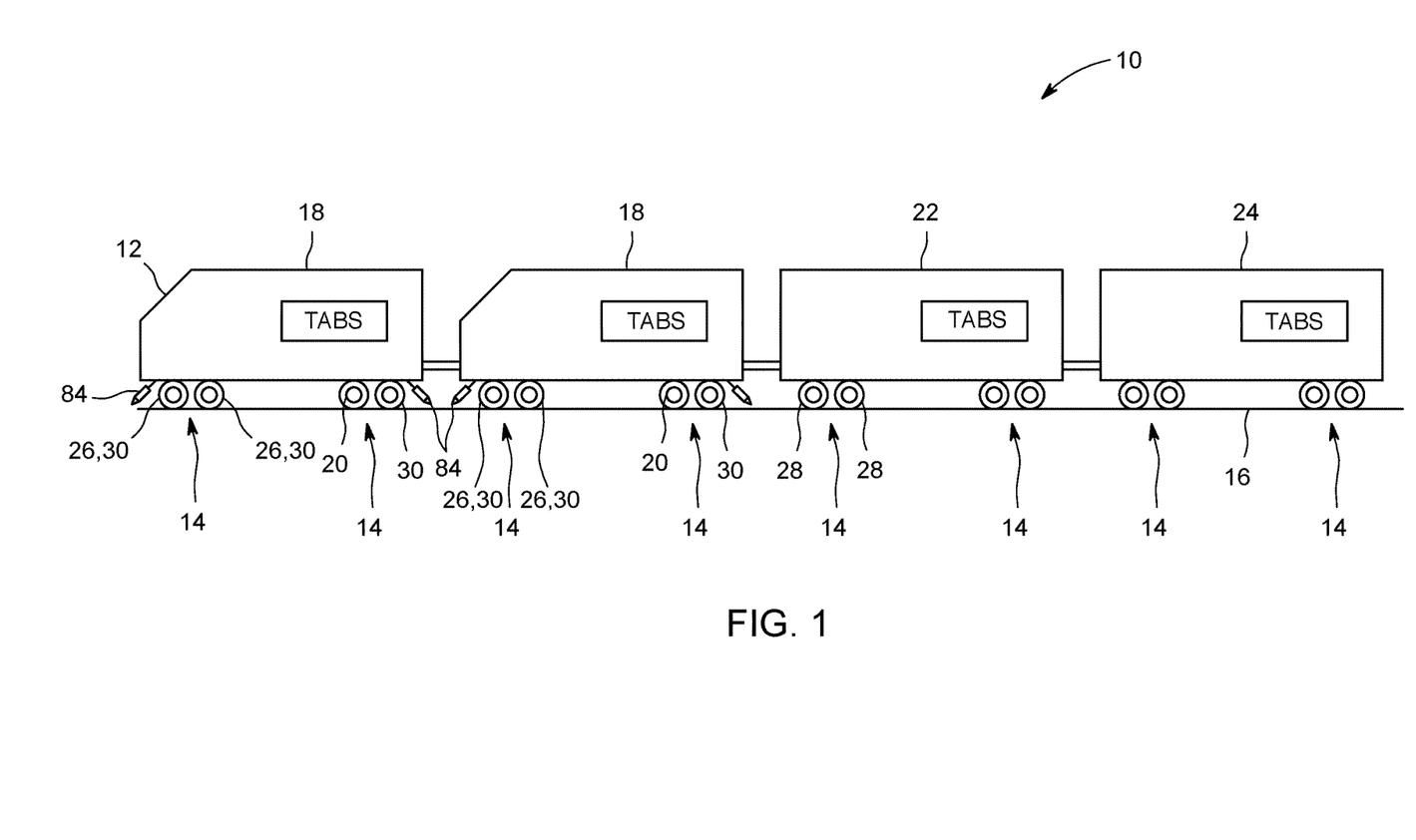
FIG. 1 is a diagram of an exemplary wheeled vehicle that incorporates a system in accordance with embodiments of the invention.

Referring to FIG. 1, embodiments of a traction control system 10, referred to alternatively as a Traction Anti-Lock Brake System ("TABS") system, may be used onboard a vehicle 12 that includes at least one wheel 14 to allow the vehicle to move across/traverse a route surface 16. Each of the wheels may have a desired adhesion requirement with respect to the traversed surface.

In the illustrated embodiment, the vehicle includes a chassis/body 18 to which the plurality of wheels is coupled to via one or more axles 20. In other embodiments, the vehicle (i.e., vehicle system) may have more than one chassis 18, 22, 24 and the wheels of the one or more chassis may be included in, or protected by, the TABS system. As shown in FIG. 1, the vehicle may be a wheeled locomotive that is part of a train consist and the traversed surface may have one or more rails. The vehicle in this example may be one or more locomotives 18 and one or more cars 22, 24 over which the TABS system is distributed. Not all cars/chassis and/or wheels need be incorporated into the TABS system.

The plurality of wheels may include one or more powered wheels 26, one or more non-powered wheels 28, and one or more braked wheels 30. Powered wheels are wheels that a propulsion force may be applied to. In embodiments, the propulsion force may be generated by an engine housed within the wheeled vehicle and distributed to the powered wheels through via a transmission, drive shaft, and/or other similar mechanical means to include traction motors. In embodiments, the traction motors may be electric, hydraulic, and/or pneumatic. Non-powered wheels are wheels to which a propulsion force is not applied to. For example, in a rail context, the wheels of the cars trailing the locomotive may be non-powered. Braked wheels are wheels to which one or more braking forces may be applied.

Figure 2:
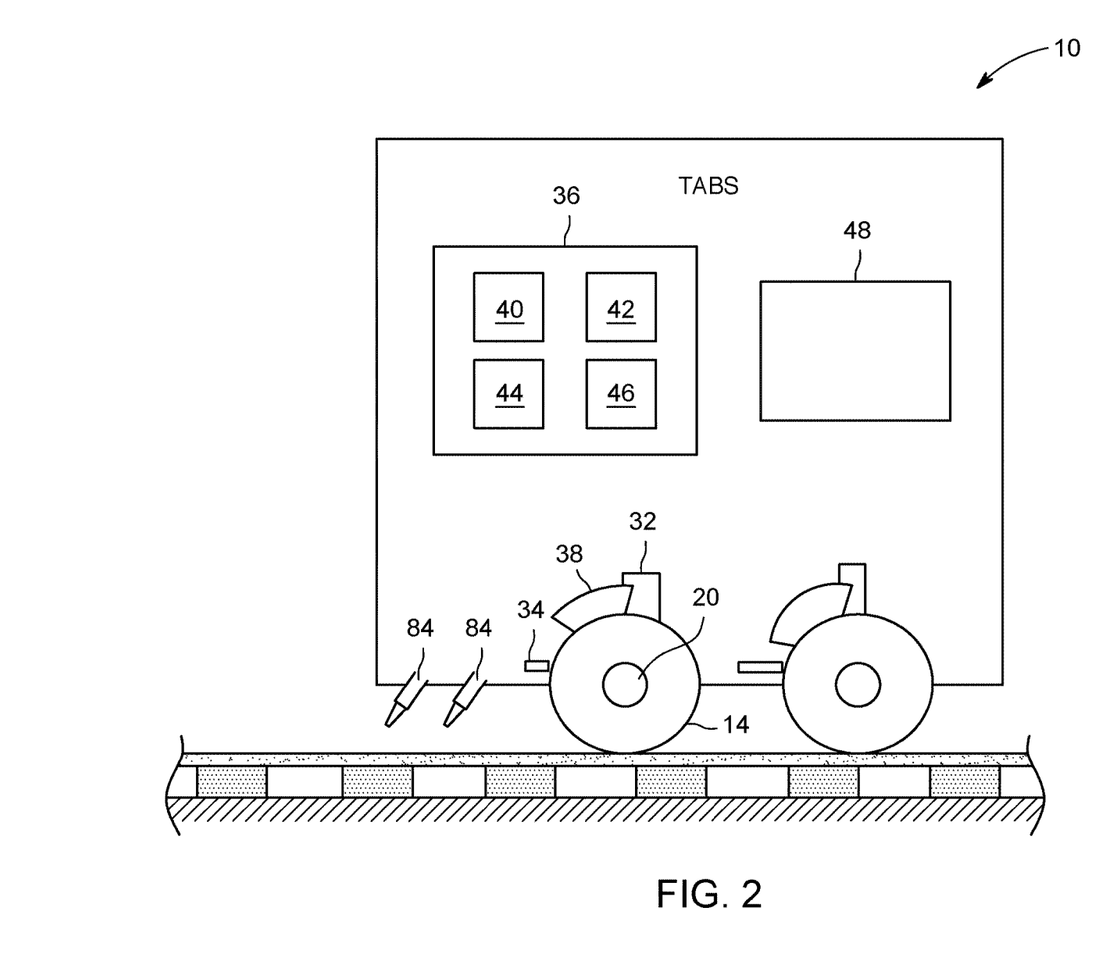
FIG. 2 is a block diagram of the exemplary system of FIG. 1.

Referring now to FIG. 2, the TABS system includes at least one traction motor 32 operatively connected to a wheel, at least one sensor 34 that detects sliding of the wheel 14, and a controller 36 that electronically communicates with the sensor and the traction motor. The controller applies a slide reducing force to the wheel via the traction motor when the sensor detects sliding of the wheel. In embodiments, the TABS system may further include a brake 38 that applies a braking force/torque to the wheel. The amount of braking torque and the rate of deceleration provided by the application of the braking torque are determined and controlled, and are based at least in part on the operational conditions and the equipment specifications. In embodiments, the brake may be a tread brake and/or friction disc, or other type of friction producing device, that is applied to the wheel and/or the axle coupled to the wheel. In such embodiments, the brake may be actuated by pneumatics, hydraulics, and/or other mechanism.

The controller coordinates and controls the various components of the TABS system. A suitable controller may be electrical, mechanical, and/or a combination thereof. For example, in embodiments, the controller may be a dedicated/specialized electrical logic circuit. In other embodiments, the controller may be a general purpose controller that is programed with one or more instructions. In such embodiments, the controller may include at least one processor (CPU) 40, a read only memory (ROM) 42 and/or a random access memory (RAM) 44, and one or more input/output ports 46. The controller may be in communication with one or more of the other components of the TABS system and/or the operator via the input/output ports. In one embodiment, a vehicle's ECU may function as the controller.

During operation, the traction motor applies a total torque to the wheel to propel the vehicle or to brake the vehicle. This total torque is determined with reference to the operator command, the actual vehicle speed, and/or the desired vehicle speed. In addition to these actual and desired vehicle speeds, there is the rotational speed of the wheel. When the actual speed of the vehicle and the rotational speed of the wheel differ, the wheel slips and/or slides on the route surface. The ability of the operator to control the vehicle, including the rate at which the actual vehicle speed can attain the desired vehicle speed, depends in large part on the tractive effort of the wheel on the route surface. When braking the vehicle and one or more wheels begin to slide, the tractive effort drops and it may take longer than desired to stop and/or attain the desired vehicle speed. Tractive effort may also be referred to as traction, adhesion, grip and the like. Accordingly, supplemental to that total torque, and according to an embodiment of the invention, there may be the application of a supplemental motoring torque and/or a braking torque to the wheel. Accordingly, in embodiments, the slide reducing force may be supplemental to the normal motoring torque or a braking torque adjusting them up or down relative to their normal amount of applied torque. In at least one embodiment, a desired outcome is that the rotational speed of the wheel is better matched to the actual vehicle speed, and thereby the wheel may have relatively more tractive effort in cooperation with the route surface. The rotational speed of the wheel, and thus the vehicle speed, may be ramped down as quickly as possible while reducing or avoiding sliding. The higher tractive effort afforded to a wheel that is not sliding allows more braking and accelerating torque to be applied and the vehicle speed should change relatively faster compared to a vehicle whose wheels are sliding or a vehicle whose torque is overly limited to avoid sliding. In one embodiment, the total torque applied to the wheel by the traction motor responsively ramps up (or down) based at least in part on the maximum torque available, as adjusted by the slide reducing force.

Suitable traction motors may be the primary motor or a supplemental motor of the wheeled vehicle, and may drive a single wheel or multiple wheels, e.g., two wheels on a common axle. In one embodiment, each wheel of the plurality of wheels may be connected to a corresponding respective traction motor. In other embodiments, however, only a few, i.e., less than all, of the wheels of the plurality may be connected to a traction motor. Suitable traction motors may be highly responsive, i.e., very little time elapses between when the controller calls for the traction motor to apply a specific amount of torque, and the time it takes for the traction motor to actually apply the specified amount of torque to the wheel. Suitable traction motors may be an Alternating Current (AC) induction motor connected to a power supply capable of providing electrical excitation which develops a controlled motoring torque. Other suitable traction motors may be permanent magnet motors. Other traction motors may be hydraulic and/or pneumatic.

The sensor may be located onboard the wheeled vehicle and may detect sliding of the wheel via assessing the rotational speed of the wheel. For example, the sensor may determine and/or estimate a speed of the wheel based at least in part on a scaled or unscaled speed of the traction motor. The sensor may detect sliding of the wheel by comparing a scaled or unscaled speed of the traction motor to a measured or estimated speed of the wheeled vehicle. In one embodiment, a sensor may detect sliding of the wheel by comparing the measured rotational speed of the wheel to the velocity of the wheeled vehicle. The velocity of the wheeled vehicle may be obtained via a GPS signal, by estimation based at least in part on the speed of one or more wheels of the plurality, and/or other means. Additionally, in embodiments, the sensor may estimate the rotational speed of the wheel based at least in part on the velocity of the wheeled vehicle. For example, the sensor may detect that a wheel is sliding if the wheel has a rotational speed of nine (9) mile/hour and the vehicle is traveling at ten (10) miles/hour. As will be appreciated, while the previous example defined a one (1) mile/hour difference between vehicle speed and wheel rotational speed as a slide, other embodiments may utilize larger or smaller differences/spreads between the vehicle speed and the rotational speed of the wheel. Further, additional slide measuring sensors may include voltage and current measurements on power electronic components that drive the traction motor, measurement of waveforms produced by the traction motor itself, measurements of revolutions per minute, and the like.

The brake may provide a braking force to the wheel that slows a rotational speed of the wheel over a period of time (also referred herein to as the braking period). In such embodiments, the slide reducing force, applied via the traction motor, adjusts the rotational speed of the wheel during the braking period. The brake may be a friction based brake, e.g., a train and/or independent air brake, a hand brake, a parking brake, and/or an emergency brake; a dynamic brake, e.g., an electronic dynamic brake similar to those commonly found on wheeled vehicles that use traction motors; or a hybrid brake that utilizes both frictional and dynamic components. The brake may be actuated automatically and/or manually depending on application specific parameters. In embodiments where the brake is a dynamic brake or a hybrid brake, the brake may include the traction motor. In such embodiments, the extended braking force includes a dynamic braking force provided by the traction motor, and the slide reducing force is accomplished via an adjustment in the dynamic braking force and may also include a further transition to a motoring force, e.g., the dynamic braking force transitions from a braking force to a motoring force that becomes the slide reducing force. For example, in embodiments where the primary brake of a wheeled vehicle is a dynamic brake, the slide reducing force may be accomplished/affected as a reduction in the magnitude of the braking force supplied by the dynamic brake. As will be appreciated, in embodiments, the traction motor may provide a motoring force to further oppose a friction brake, a torque provided by the frictional brake, and/or other torque, if needed to arrest a slide. In some embodiments, the brake may be applied when the wheeled vehicle is in an unpowered mode where a propulsion force is not being applied to the powered wheels, e.g., coasting down a hill or straight away. It is to be understood that application of the brake may occur while a traction motor is providing normal operating torque for the vehicle, e.g., motoring torque and/or dynamic braking.

In embodiments, the slide reducing force may maintain and/or limit the creep level of the wheel to a specified creep level. As used herein, the term creep level means the speed of the wheel relative to the rail. For example, zero creep implies a synchronism between the wheel at the wheel contact area and the surface. Accordingly, negative creep specifies a relative sliding of the wheel in relation to the surface. In embodiments, the specified creep level may be the maximum creep level achievable by the wheel.

The TABS system may further include an annunciator 48 that annunciates when the traction motor is applying the slide reducing force. As stated above, operators of wheeled vehicles may not be aware that they may be excessively applying a braking force to one or more wheels. Thus, the annunciator may inform the operator of excessive brake application, thereby allowing the operator an opportunity to manually reduce the extended braking force. In embodiments, the annunciator may generate a signal discernable by one or more of an operator of the vehicle, a person proximate and external to the vehicle, a device stationed on a wayside of the route proximate to the vehicle, a second vehicle that is located on the route, and/or a remotely located data center.

Figure 3:
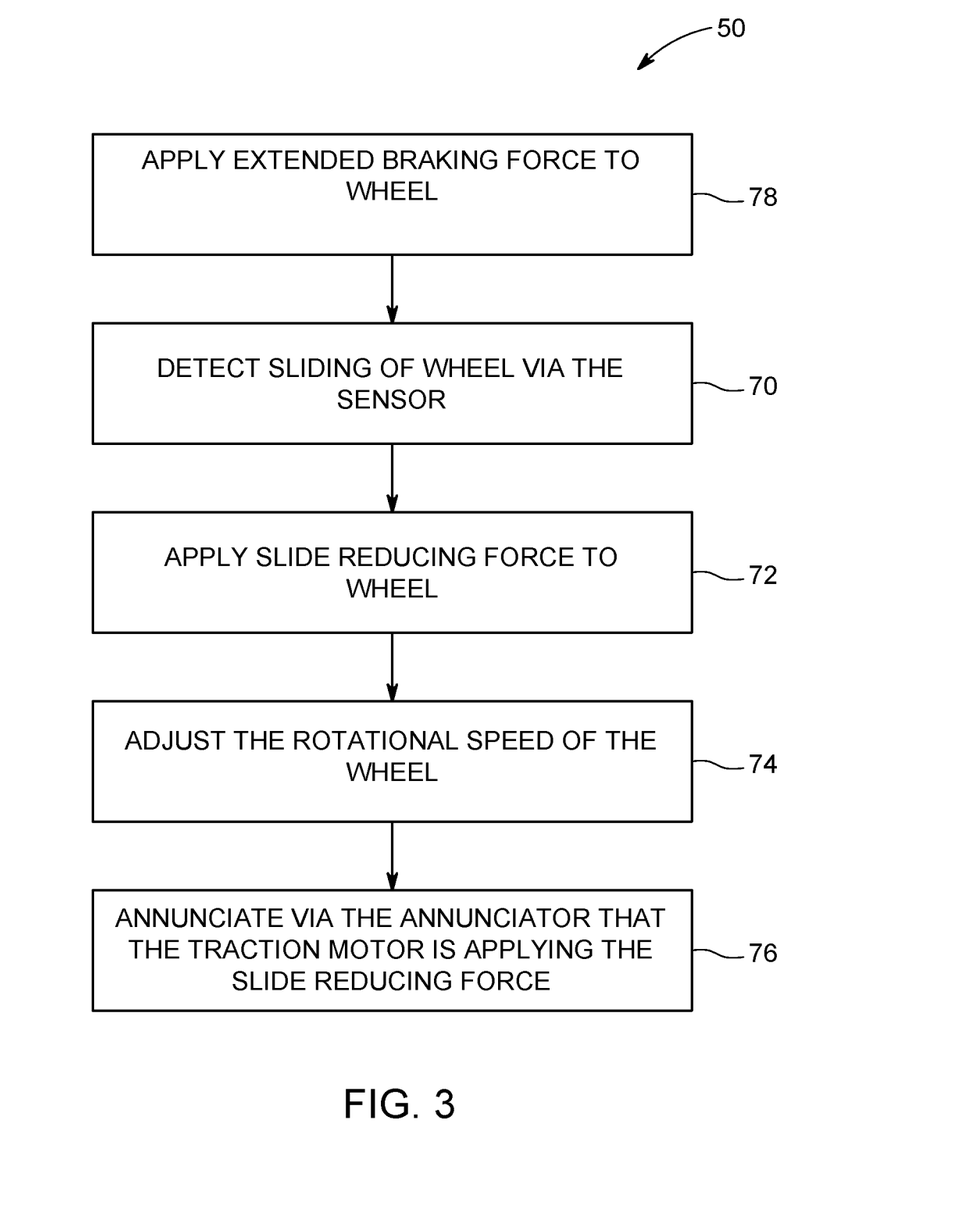
FIG. 3 is flow chart showing a method for providing traction control for the wheeled vehicle of FIG. 1 in accordance with embodiments of the invention.
Figure 4:
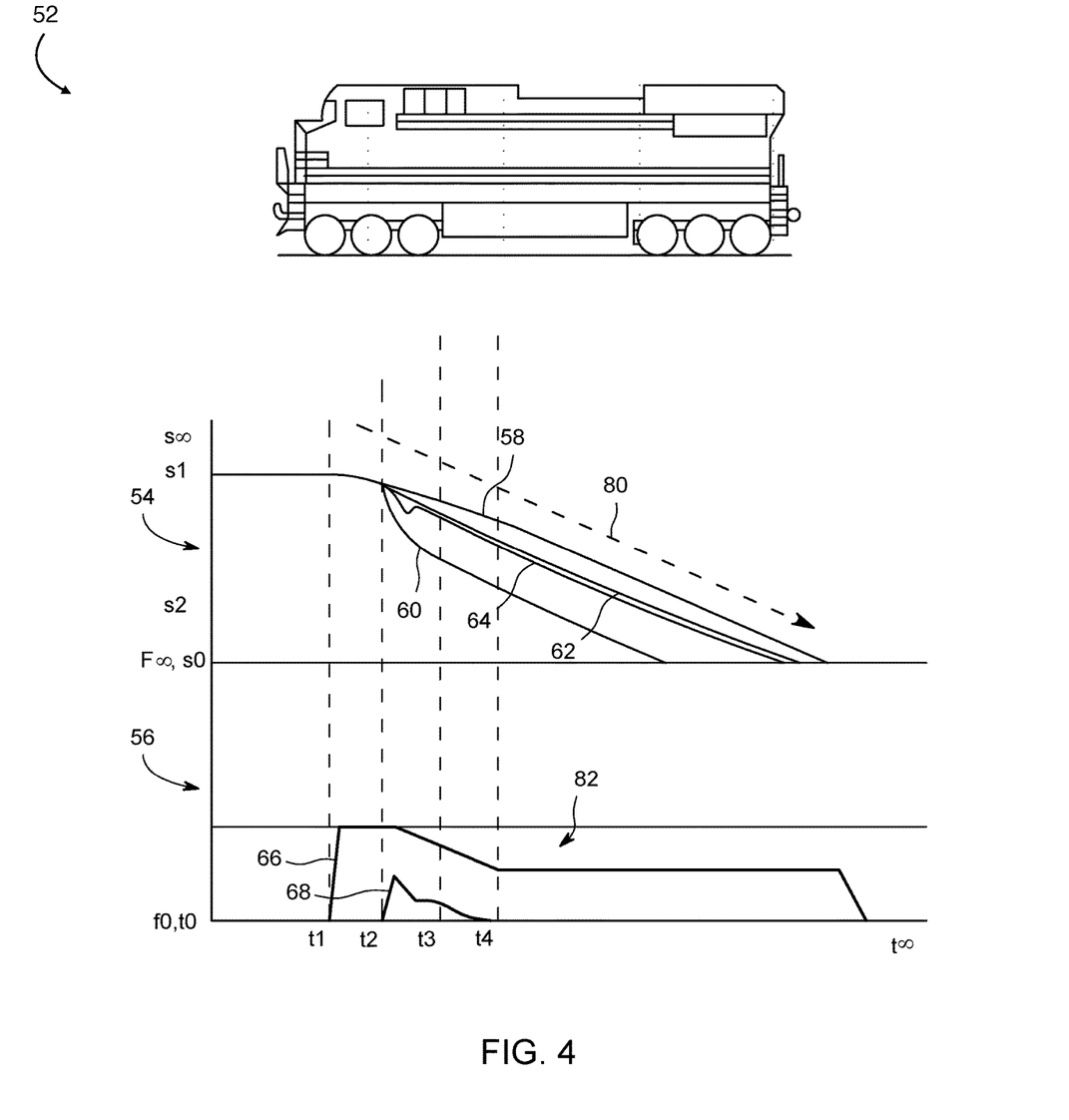
FIG. 4 is a graphical chart that depicts the prevention of wheel slide by the system of FIG. 1 in accordance with embodiments of the invention.

Referring now to FIGS. 3 and 4, a method 50 for providing traction control for the wheeled vehicle utilizing the TABS system, and a graphical chart 52 depicting the results of the method, in accordance with embodiments of the invention, are shown. A braking application may be stored in the ROM (or other suitable memory device) and loaded into the RAM such that the controller is adapted to perform method 50. Accordingly, as can be seen in FIG. 4, the vertical axis/domain of chart 52 is divided into first and second regions 54 and 56. The first region 54 represents speed S from S0 (0 velocity) to S∞ (the maximum velocity achievable by the wheeled vehicle), and the second region 56 represent force from f0 (zero applied force) to f∞ (the maximum force which can be applied to the wheel). The horizontal axis/range of chart 52 represents time t from t0 (the time just before the start of a braking period) to t∞ (the just after the end of the braking period). Further, the lines 58, 60 represent the chassis/vehicle speed and the wheel speed of a wheeled vehicle that does not utilize the TABS system, respectively; the lines 62, 64 represent the chassis speed and the wheel speed of a wheeled vehicle that utilizes the TABS system, respectively; and the lines 66, 68 represent the extended braking force (in both wheeled vehicles lacking and having the TABS system) and the slide reducing force (in wheeled vehicles having the TABS system), respectively. The chart 52 may not be drawn to scale but demonstrates/contrasts the relationships between the chassis speeds 58, 62 and wheel speeds 60, 64 of vehicles lacking the TABS system against vehicles utilizing the TABS system.

Accordingly, as shown in FIG. 3, the method includes detecting 70 sliding of a wheel on a route surface resulting from a frictional braking force; and applying 72 a slide reducing force to the wheel via a traction motor operatively connected to the wheel. In embodiments, the method may further include adjusting 74 a rotational speed of the wheel via the slide reducing force. Additionally, in embodiments, the method further includes annunciating 76 that the traction motor is applying the slide reducing force. Annunciating may include generating a signal discernable by one or more of an operator of the vehicle, a person proximate and external to the vehicle, a device stationed on a wayside of the route proximate to the vehicle, a second vehicle that is located on the route, and a remotely located data center. In embodiments, the second vehicle may respond to the signal by changing an operating parameter of the second vehicle. As further shown in FIG. 3, in embodiments, the method may further include applying 78 the extended braking force to the wheel, e.g., application of a air brake by an operator.

For example, as shown in FIG. 4, just before the start of the braking period at t0, the wheeled vehicle may be traveling at speed 51. As no braking forces have yet been applied to the wheel, the rotation speed of wheel is synchronous with the chassis speed. At time t1, the operator applies an extended braking force to the wheel via the brake. As shown by arrow 80, the extended braking force results in a long term reduction in the rotational speed of wheel, which in turn results in a reduction in the chassis speed of the wheeled vehicle.

As shown at t2, the rotational speed of wheel begins to slow below synchronous speed with the chassis speed, i.e., wheel beings to slide. Accordingly, in embodiments, the sensor detects this sliding and the controller applies the slide reducing force to adjust the rotational speed of wheel such that wheel fails to enter a full slide at t3. Specifically, application of the slide reducing force to the wheel counteracts the extended braking force, applied by the brake, such that the effect of the extended braking force on the wheel is reduced. The traction motor may arrest an ongoing slide of the wheel and/or prevent the wheel from sliding altogether. During this time, the annunciator may annunciate that the traction motor is applying the slide reducing force, thereby triggering the operator to reduce the magnitude of the extended braking force as shown by arrow 82.

As can be seen between t2 and t4, the controller may adjust the magnitude of the slide reducing force in accordance with adjustments in the extended braking force such that the rotational speed of wheel is kept at a specified creep level (depicted in FIG. 4 as the space between the rotational speed of wheel and the chassis speed of the wheeled vehicle). In particular, the slide reducing force may be reduced or increased as the extended braking force is reduced or increases, respectively. The controller may maintain the rotational speed of wheel at the specified creep level until the chassis speed of the wheeled vehicle is at the new desired speed S2 or to a complete stop, represented by S0. In embodiments, the traction motor may only apply enough slide reducing force to prevent wheel from sliding. In other words, in some embodiments, the slide reducing force applied by the traction motor may be transient, i.e., the traction motor only supplies a force to wheel to reduces and/or arrest an ongoing slide, and removed once the risk of sliding has been reduced. Accordingly, the traction motor may be an electric motor that has, and/or is returned to, a zero current state when the sensor does not detect sliding of wheel.

As used herein, the term "zero current state describes the state of an electric motor having very little or no electrical current, i.e., the electric motor is not generating a force, which may result from interrupting the motor's power supply and/or keeping the motor's power supply at low levels. Keeping the traction motor in a zero current state when not required to provide the slide reducing force may reduce wear on the traction motor, increase overall safety of the wheeled vehicle, and/or may increase the power efficiency of the wheeled vehicle. Accordingly, the traction motor may be kept in an unpowered state when not required by the controller to provide the slide reducing force. In such embodiments, the traction motor may be powered once the sensor has detected that the sliding of the wheel has exceeded a threshold value.

In embodiments, the controller may delay excitation of the traction motor until the sensor has detected sliding of the wheel. Further, the controller may direct the traction motor to apply the slide reducing force as a series of pulsed motoring torque applications. In such embodiments, the series of applications may each be of a determined duration. The applications may be separated from one another by one or more subsequent pause periods that may also be of a determined duration. The duration of application periods and/or the subsequent pause periods may be determined responsive to or based on one or more of a vehicle speed, a vehicle load weight, and/or a magnitude of the detected sliding.

Additionally, in embodiments, the TABS system may further include dispensers (element 84 in FIGS. 1 and 2) that dispense a friction modifier, such as sand, into the path between the wheels and the surface. In particular, the controller may determine that dispensing the friction modifier is required to keep the wheel at and/or near the specified creep level. In embodiments, the friction modifier may be dispensed after the sensor has detected that the wheel has exceeded a sliding threshold, e.g., the wheel is excessively sliding and/or has a high risk of entering into a full slide. The dispensing of the friction modifier may be automatic and/or manually controlled. In embodiments, dispensing the friction modifier into the path of the wheel increases the amount of adhesion between the wheel and the surface such that the wheel is brought out of a full slide and/or the risk of the wheel entering a full slide is reduced.

The system may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein. For example, as previously mentioned, the system may include at least one processor, and system memory, which may include random access memory (RAM) and read-only memory (ROM). The system may further include an input/output controller, and one or more data storage structures. All of these latter elements may be in communication with the at least one processor to facilitate the operation of the system as discussed above. Suitable computer program code may be provided for executing numerous functions, including those discussed above in connection with the system and methods disclosed herein. The computer program code may also include program elements such as an operating system, a database management system and device drivers that allow the system, to interface with computer peripheral devices, e.g., sensors, a video display, a keyboard, a computer mouse, or other similar device.

The at least one processor of the system may include one or more conventional microprocessors and one or more supplementary co-processors such as math co-processors or the like. Elements in communication with each other need not be continually signaling or transmitting to each other. On the contrary, such elements may transmit to each other as necessary, may refrain from exchanging data at certain times, and may cause several steps to be performed to establish a communication link there-between.

The data storage structures such as memory discussed herein may include an appropriate combination of magnetic, optical and/or semiconductor memory, and may include, for example, RAM, ROM, flash drive, an optical disc such as a compact disc and/or a hard disk or drive. The data storage structures may store, for example, information required by the system and/or one or more programs, e.g., computer program code such as the braking application and/or other computer program product, adapted to direct the system.

The program may be implemented in programmable hardware devices such as field programmable gate arrays, programmable array logic, programmable logic devices or the like. Programs may also be implemented in software for execution by various types of computer processors. A program of executable code may, for instance, includes one or more physical or logical blocks of computer instructions, which may, for instance, be organized as an object, procedure, process or function. Nevertheless, the executables of an identified program need not be physically located together, but may include separate instructions stored in different locations which, when joined logically together, form the program and achieve the stated purpose for the programs such as preserving privacy by executing the plurality of random operations. In an embodiment, an application of executable code may be a compilation of many instructions, and may even be distributed over several different code partitions or segments, among different programs, and across several devices.

The term computer-readable medium as used herein refers to a medium that provides or participates in providing instructions to at least one processor of the system (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which may constitute the main memory. Forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to at least one processor for execution. For example, the instructions may initially be borne on a magnetic disk of a remote computer (not shown). The remote computer can load the instructions into its dynamic memory and send the instructions over an Ethernet connection, cable line, or telephone line using a modem. A communications device local to a computing device, e.g., a server, can receive the data on the respective communications line and place the data on a system bus for at least one processor. The system bus carries the data to main memory, from which the at least one processor retrieves and executes the instructions. The instructions received by main memory may optionally be stored in memory either before or after execution by the at least one processor. In addition, instructions may be received via a communication port as electrical, electromagnetic or optical signals, which are exemplary forms of wireless communications or data streams that carry various types of information.

In one embodiment, a system includes a sensor and a controller. The sensor is configured to detect sliding of a wheel of a vehicle. The controller is configured to communicate with the sensor and a traction motor operatively connected to the wheel such that the traction motor selectively applies forces in at least one direction to the wheel during operation. The controller is further configured to direct the traction motor to apply a motoring slide reducing force to the wheel when the sensor detects sliding of the wheel resulting from a frictional braking force. In certain embodiments, the traction motor is configured to normally provide a motoring force or braking force to the wheel, and the slide reducing force is a motoring torque configured to directly oppose another torque applied to the wheel. In certain embodiments, the slide reducing force is transient and adjusts the rotational speed of the wheel so as to limit or arrest sliding of the wheel. In certain embodiments, the frictional braking force is provided by a friction brake or a hybrid brake, the hybrid brake including both a dynamic braking component and a frictional braking component. In certain embodiments, the controller is further configured to direct the traction motor to apply the slide reducing force by adjusting a dynamic braking force such that the dynamic braking force transitions from a braking force to a motoring force that becomes the slide reducing force to arrest sliding of the wheel. In certain embodiments, the controller is further configured to determine from the sensor a magnitude value for the sliding, and the controller determines a corresponding magnitude of the slide reducing force to be generated, and thereby to provide sufficient torque to the wheel to substantially match a rotational speed of the wheel to an actual vehicle speed. In certain embodiments, the system further includes an annunciator configured to annunciate when the traction motor is applying the slide reducing force. In certain embodiments, the wheeled vehicle is a rail vehicle. In certain embodiments, the controller is further configured to delay an excitation of the traction motor until the sensor has detected sliding of the wheel.

In one embodiment, a method for a vehicle includes detecting sliding of a wheel on a route surface resulting from a frictional braking force; and applying a slide reducing force to the wheel via a traction motor operatively connected to the wheel. In certain embodiments, the slide reducing force is a motoring torque, and the method further includes applying the motoring torque to the wheel in a transient manner so as to adjust a total torque applied by the traction motor to the wheel such that a rotational speed of the wheel is adjusted. In certain embodiments, applying the motoring torque includes a series of pulsed motoring torque applications, and an application period of each application and a subsequent pause period between each application are each of a determined duration. In certain embodiments, the durations of the application period and the subsequent pause period are determined responsive to or based on one or more of a vehicle speed, a vehicle load weight, and a magnitude of the detected sliding. In certain embodiments, the frictional braking force is provided by a frictional braking component of a hybrid brake that also includes a dynamic braking component that provides a dynamic braking force via the traction motor. In such embodiments, the slide reducing force is accomplished as an adjustment in the dynamic braking force such that the dynamic braking force transitions from a braking force to a motoring force to arrest sliding of the wheel. In certain embodiments, applying a slide reducing force to the wheel via a traction motor operatively connected to the wheel limits the wheel to a specified creep level. In certain embodiments, the method further includes annunciating that the traction motor is applying the slide reducing force. In certain embodiments, annunciating includes generating a signal discernable by one or more of an operator of the vehicle, a person proximate and external to the vehicle, a device stationed on a wayside of the route proximate to the vehicle, a second vehicle that is located on the route, and a remotely located data center. In certain embodiments, the second vehicle responds to the signal by changing an operating parameter of the second vehicle.

In one embodiment, a controller is configured to communicate with a sensor and a traction motor. The sensor detects sliding of a wheel of a vehicle, and the traction motor operatively connects to the wheel so as to selectively apply a motoring or a braking force to the wheel during operation. The controller is further configured to direct the traction motor to apply a motoring slide reducing force to the wheel when the sensor detects sliding of the wheel resulting from a frictional braking force. In certain embodiments, the controller is further configured to delay an excitation of the traction motor until the sensor has detected sliding of the wheel.

In one embodiment, a system includes a sensor that detects sliding of a wheel; and a controller that communicates with the sensor and a traction motor operatively connected to a wheel of a vehicle such that the traction motor selectively applies one or more forces to the wheel during operation. The controller directs the traction motor to apply a motoring slide reducing force to the wheel when the sensor detects sliding of the wheel resulting from a frictional braking force. The traction motor normally provides a motoring torque to the wheel to propel the vehicle, and the slide reducing force is an additional motoring torque beyond the motoring torque normally provided by the traction motor and directly opposed to the frictional braking force.

In one embodiment, a wheeled vehicle includes a body, a braking system, a traction motor, a sensor, and a controller. The body includes a plurality of wheels that allow the wheeled vehicle to traverse a route surface. The braking system provides a braking force to a wheel to slow the vehicle and reduce the vehicle speed. The traction motor is operatively connected to the wheel. The sensor detects sliding of the wheel. The controller communicates with the braking system, the traction motor, and the sensor. When the sensor detects sliding of the wheel, the controller may adapt the traction motor to apply a slide reducing force to the wheel in the motoring direction such that the rotational speed of the wheel is limited to a specified creep level during the period of time that the applied braking force exceeds the friction available at the wheel contact surface. That is, motoring force from the traction motor is applied and regulated by the controller such that a rotational speed of the wheel is controlled to substantially match the vehicle speed, and thus to increase or maximize tractive effort, and reduce the rotational speed of the wheel (and the vehicle speed) at a rate that reduces sliding, and increases adhesion. Increasing tractive effort allows the actual vehicle speed to attain the desired vehicle speed in a minimized or determined period of time.

In one embodiment, a locomotive or train is provided that includes a body, a friction brake, an electric traction motor, a sensor, and a controller. The body includes a plurality of wheels that allow the train to traverse a set of rails. The friction brake provides an extended braking force to a wheel of the plurality intended to limit or slow a rotational speed of the wheel over a determined period of time. The electric traction motor is operatively connected to the wheel. The sensor detects sliding of the wheel by comparing a speed of the wheel to a speed of the train. The controller communicates with the friction brake, the traction motor, and the sensor. When the sensor detects sliding of the wheel, the controller adapts the traction motor to apply a transient motoring torque to the wheel such that the rotational speed of the wheel is limited to a specified creep level during the period of time the applied friction braking force exceeds the friction available at the wheel/rail contact surface.

The system can include an annunciator that can annunciate when the traction motor is applying the slide reducing force. A suitable annunciator may signal an amount and type of slide reducing force application, too. It may be a simple high/low indication, or it may be graduated to reflect the amount being applied. It may be an audible signal, a visual signal or haptic feedback, or a combination of the foregoing. The signal may be sent to the operator, to a recording device, to a wayside device, to proximate people or vehicles (to the subject vehicle), or to a back office data center, or a combination. That signal may initiate further responsive activities, such as marking a route segment as being slide inducing, changing an operation of the engine of the subject vehicle, changing the operation of a vehicle proximate to the subject vehicle (such as one following along the subject vehicle on the route), and the like.

In an embodiment, a method may include detecting sliding of a wheel of a wheeled vehicle via a sensor in communication with a controller. A slide reducing force may be applied to the wheel via a traction motor operatively connected to the wheel and in communication with the controller. In one embodiment, the slide reducing force is a motoring torque. In another embodiment, the slide reducing force is a braking torque. A braking torque may be applied to the wheel that slows a rotational speed of the wheel over a period of time; and adjusts the rotational speed of the wheel during the period of time via the slide reducing force. It is notable that the slide reducing force (and thus the braking torque) is distinguishable from the actual braking force that is a result of a system request to control the vehicle speed. The torque, may be applied continuously or in pulses. If pulses, the pulses may be simple, uniform on/off periods spaced at regular intervals. In one embodiment, the frequency of the pulses may be changed based on the operating conditions (such as the sensor readings regarding the sliding, the vehicle specifications (weight, load, type), the route information (condition of the route surface, grade, type of route), the vehicle speed, and the like).

In one embodiment, the brake is a dynamic brake or a hybrid brake, the brake includes the traction motor, the extended braking force includes a dynamic braking force provided by the traction motor, and the slide reducing force is accomplished via an adjustment in the dynamic braking force. In such embodiments, the adjustment to the dynamic braking force may transition the dynamic braking force to a motoring force. A slide reducing force may be applied to the wheel via a traction motor operatively connected to the wheel and in communication with the controller such that the slide reducing force maintains and/or limits the wheel at/to a specified creep or slide level. In one embodiment, a signal is generated announcing that the traction motor is applying the slide reducing force. A friction modifier may be responsively dispensed into the path of the wheel via a dispenser. Suitable dispensers may be disposed onboard the wheeled vehicle, located on a wayside of the route, or may be secured to other vehicles traversing the route.

A wheeled vehicle according to an embodiment may include a body, a braking system, a traction motor, a sensor, and a controller. The body includes a plurality of wheels that allow the wheeled vehicle to traverse a surface. The braking system provides a braking force to at least one wheel of the plurality such that a rotational speed of the wheel may decrease over a period of time. The traction motor is operatively connected to the wheel. The sensor detects sliding of the wheel. The controller communicates with the braking system, the traction motor, and the sensor. When the sensor detects sliding of the wheel, the controller adapts the traction motor to apply a sliding reducing force to the wheel such that the rotational speed of the wheel is maintained and/or limited at/to a specified creep level during the period of time the extended braking force exceeds the friction between the wheel and the route surface. In one embodiment, the slide reducing force is a motoring torque. In one embodiment, the extended braking force includes a dynamic braking force provided by the traction motor, and the slide reducing force is accomplished as an adjustment in the dynamic braking force. In such embodiments, the adjustment may transition the dynamic braking force into a motoring torque if needed to arrest the slide. In one embodiment, the wheeled vehicle is a rail vehicle.

A train may be provided that includes a body, a friction brake, an electric traction motor, a sensor, and a controller. The body includes a plurality of wheels that allow the train to traverse a set of rails. The friction brake provides an extended braking force to a wheel of the plurality such that a rotational speed of the wheel is decreased over a period of time. The electric traction motor is operatively connected to the wheel. In this embodiment, the sensor may detect sliding of the wheel by comparing a speed of the wheel to a speed of the train. The controller communicates with the friction brake, the traction motor, and the sensor. When the sensor detects sliding of the wheel, the controller adapts the traction motor to apply a transient motoring torque to the wheel such that the rotational speed of the wheel is limited to a specified creep level during the period of time the extended braking force exceeds the friction between the wheel and the rail. The electric traction motor may have a zero current state when the sensor does not detect sliding of the wheel.

In one embodiment, a system includes a sensor and a controller. The sensor detects sliding of a wheel. The controller communicates with the sensor and a traction motor operatively connected to a wheel of a vehicle such that the traction motor selectively applies a motoring force to the wheel during operation. The controller directs the traction motor to apply a slide reducing force to the wheel when the sensor detects sliding of the wheel resulting from a frictional braking force, and the slide reducing force differs from the motoring force or is an adjustment to the motoring force. In certain embodiments, the motoring force is a motoring torque provided to the wheel to propel the vehicle, and the slide reducing force is an additional torque beyond the motoring torque. In certain embodiments, the slide reducing force is a braking torque such that the net torque applied to the wheel is less than a motoring torque provided to the wheel to propel the vehicle at a determined speed. In certain embodiments, the slide reducing force is transient and adjusts the rotational speed of the wheel so as to limit or arrest sliding of the wheel. In certain embodiments, the frictional braking force is provided by a friction brake or a hybrid brake that includes both a dynamic brake and a friction brake. In certain embodiments, the controller adjusts a dynamic braking force to provide the slide reducing force. In certain embodiments, the controller determines from the sensor a magnitude value for the sliding, and the controller determines a corresponding magnitude of slide reducing force to be generated, and thereby to provide sufficient torque to the wheel to substantially match a rotational speed of the wheel to an actual vehicle speed. In certain embodiments, the system further includes an annunciator that annunciates when the traction motor is applying the slide reducing force. In certain embodiments, the wheeled vehicle is a rail vehicle.

By utilizing traction motors to prevent/arrest wheel sliding via application of a slide reducing force, some embodiments provide for the ability to quickly adjust sliding wheels in order to arrest and/or prevent a wheel slide. Accordingly, by arresting and/or preventing wheel slides, some embodiments of the present invention reduce the amount of damage incurred by wheels resulting from the over application of a brake by an operator. Further, by maintaining and/or limiting the rotational speed of the wheel at/to a specified creep level, some embodiments of the present invention provide for increased braking ability, i.e., in some embodiments, the TABS system allows the wheeled vehicle to stop in a shorter distance than would otherwise be possible for a given weight and speed. Further still, by utilizing traction motors, which as stated above have a fast responsiveness, to adjust the rotational speed of the wheel, some embodiments of the present invention provide for more refined control over the rotational speed of the wheel than would otherwise be possible.

Additionally, the TABS system of some embodiments may be able to individually control the braking and/or motoring forces applied to one or more wheels that are disposed on opposite sides of the same axel, e.g. left and right co-axel wheels. Accordingly, the slide reducing force and/or the braking force in such embodiments may be applied differently during turns to the outside wheel (i.e., the left/right wheel during a right/left turn) and the inside wheel (i.e., the right/left wheel during a left/right turn).

The references herein are made in detail to exemplary embodiments of the invention, examples of which are illustrated in the accompanying drawings. Wherever possible, the same reference characters used throughout the drawings refer to the same or like parts, without duplicative description. Additionally, while the embodiments herein are shown and discussed in the context of rail vehicles, e.g., locomotives or trains, other embodiments disclosed herein may apply to non-rail vehicles, such as cars and trucks (EV and HEV included), planes and/or other types of vehicles that traverse a surface via one or more wheels. For example, in embodiments of the invention implemented in EV/HEV cars and trucks. Additionally, other embodiments may be used in applications, apart from wheeled vehicles, in which one or more wheels are used to allow two or more structures and/or surfaces to move in relation to each other, e.g., conveyor belts, and/or other manufacturing devices.

Further, as used herein, an element or step recited in the singular and proceeded with the word 'a' or 'an' do not exclude plural of said elements or steps, unless such exclusion is explicitly stated. Additionally, references to one embodiment of the present invention are not intended to be interpreted as excluding the existence of additional embodiments that also incorporate the recited features. Moreover, unless explicitly stated to the contrary, embodiments comprising, including, or having an element or a plurality of elements having a particular property may include additional such elements not having that property. Furthermore, as used herein, the terms substantially, generally, and about indicate conditions within reasonably achievable manufacturing and assembly tolerances, relative to ideal desired conditions suitable for achieving the functional purpose of a component or assembly.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
    a sensor configured to detect sliding of a wheel of a vehicle; and
    a controller configured to communicate with the sensor and a traction motor operatively connected to the wheel such that the traction motor selectively applies forces in at least one direction to the wheel during operation;
    wherein the controller is further configured to direct the traction motor to apply a motoring slide reducing force to the wheel when the sensor detects sliding of the wheel resulting from a frictional braking force.

2. The system of claim 1, wherein the traction motor is configured to normally provide a motoring force or braking force to the wheel, and
    the slide reducing force is a motoring torque configured to directly oppose another torque applied to the wheel.

3. The system of claim 1, wherein the slide reducing force is transient and adjusts the rotational speed of the wheel so as to limit or arrest sliding of the wheel.

4. The system of claim 1, wherein the frictional braking force is provided by a friction brake or a hybrid brake, the hybrid brake including both a dynamic braking component and a frictional braking component.

5. The system of claim 4, wherein the controller is further configured to direct the traction motor to apply the slide reducing force by adjusting a dynamic braking force such that the dynamic braking force transitions from a braking force to a motoring force that becomes the slide reducing force to arrest sliding of the wheel.

6. The system of claim 1, wherein the controller is further configured to determine from the sensor a magnitude value for the sliding, and the controller determines a corresponding magnitude of the slide reducing force to be generated, and thereby to provide sufficient torque to the wheel to substantially match a rotational speed of the wheel to an actual vehicle speed.

7. The system of claim 1, wherein the system further comprises an annunciator configured to annunciate when the traction motor is applying the slide reducing force.

8. The system of claim 1, wherein the vehicle is a rail vehicle.

9. The system of claim 1, wherein the controller is further configured to delay an excitation of the traction motor until the sensor has detected sliding of the wheel.

10. A method for a vehicle, comprising:
    detecting sliding of a wheel on a route surface resulting from a frictional braking force; and applying a motoring slide reducing force to the wheel via a traction motor operatively connected to the wheel, the motoring slide reducing force being configured to directly oppose the frictional braking force applied to the wheel.

11. The method of claim 10, wherein the slide reducing force is a motoring torque, and the method further comprises:
applying the motoring torque to the wheel in a transient manner so as to adjust a total torque applied by the traction motor to the wheel such that a rotational speed of the wheel is adjusted.

12. The method of claim 11, wherein applying the motoring torque comprises a series of pulsed motoring torque applications, and an application period of each application and a subsequent pause period between each application are each of a determined duration.

13. The method of claim 12, wherein the durations of the application period and the subsequent pause period are determined responsive to or based on one or more of a vehicle speed, a vehicle load weight, or a magnitude of the detected sliding.

14. The method of claim 10, wherein
the frictional braking force is provided by a frictional braking component of a hybrid brake that also includes a dynamic braking component that provides a dynamic braking force via the traction motor, and
the slide reducing force is accomplished as an adjustment in the dynamic braking force such that the dynamic braking force transitions from a braking force to a motoring force to arrest sliding of the wheel.

15. The method of claim 10, wherein applying the slide reducing force to the wheel via the traction motor operatively connected to the wheel limits the wheel to a specified creep level.

16. The method of claim 10, further comprising:
annunciating that the traction motor is applying the slide reducing force.

17. The method of claim 16, wherein the annunciating comprises:
generating a signal discernable by one or more of an operator of the vehicle, a person proximate and external to the vehicle, a device stationed on a wayside of the route proximate to the vehicle, a second vehicle that is located on the route, or a remotely located data center.

18. The method of claim 17, wherein the second vehicle responds to the signal by changing an operating parameter of the second vehicle.

19. A controller comprising:
at least one processor; and
one or more input/output ports;
wherein the at least one processor is configured to communicate through the one or more input/output ports with a traction motor and a sensor that is configured to detect sliding of a wheel of a vehicle, and the traction motor operatively connects to the wheel so as to selectively apply a motoring or a braking force to the wheel during operation; and
wherein the at least one processor is further configured to direct the traction motor to apply a motoring slide reducing force to the wheel when the sensor detects sliding of the wheel resulting from a frictional braking force.

20. The controller of claim 19, wherein the at least one processor is further configured to delay an excitation of the traction motor until the sensor has detected sliding of the wheel.

* * * * *